United States Patent [19]

Hayashi et al.

[11] Patent Number: 5,139,832
[45] Date of Patent: Aug. 18, 1992

[54] SHAPE MEMORY FILM

[75] Inventors: Shunichi Hayashi; Hiroshi Fujimura; Makoto Shimizu, all of Mitsubishi, Japan

[73] Assignee: Mitsubishi Jukogyo Kabushiki Kaisha, Tokyo, Japan

[21] Appl. No.: 420,565

[22] Filed: Oct. 12, 1989

[30] Foreign Application Priority Data

Oct. 14, 1988 [JP] Japan .................... 63-257230

[51] Int. Cl.$^5$ .............. B32B 27/00; B29C 41/00
[52] U.S. Cl. .................. 428/35.5; 428/423.1; 428/913; 264/230; 528/44
[58] Field of Search ........... 428/411.1, 423.1, 35.5

[56] References Cited

U.S. PATENT DOCUMENTS 2,468,731 5/1949 Borkland .
3,562,973 2/1971 Arditti et al. .

FOREIGN PATENT DOCUMENTS 130236 5/1975 Japan .
293214 6/1985 Japan .

OTHER PUBLICATIONS

"Development of Polymeric Elasticity Memory Material", Mitsubishi Juko GIHO vol. 25, No. 3 (1988) pp. 236–240).

Primary Examiner—P. C. Sluby
Attorney, Agent, or Firm—McAulay Fisher Nissen Goldberg & Kiel

[57] ABSTRACT

A shape memory film formed from a shape memory transparent polymer, said shape memory film being capable of remembering a basic shape such as plane configuration and dead folds, taking on a second shape when the basic shape is modified (by changing the plane configuration and adding dead folds, twists, three-dimensional configurations, etc.) at a temperature higher than the glass transition point of the polymer and lower than the molding temperature of the polymer, and having the second shape set when cooled to a temperature lower than the glass transition point while being kept in the second shape; and a method of using said shape memory film by setting the second shape and subsequently heating the film to a temperature higher than the glass transition point, thereby causing the film to restore its basic shape.

4 Claims, No Drawings

SHAPE MEMORY FILM

FIELD OF THE INVENTION AND RELATED ART STATEMENT

The present invention relates to a shape memory film and a method of using the same, said shape memory film being capable of remembering a first shape (referred to as a basic shape hereinafter) and taking on a second shape easily.

A variety of plastic films varying in thickness and shape are available for packaging and other uses. Thick ones are fabricated into covering sheets, shopping bags, etc. by cutting in adequate shape and heat-sealing ends, and thin ones are used for food packaging bags, throwaway bags, etc.

Most of the conventional plastic films have their glass transition point (Tg for short hereinafter) lower than the temperature at which they are used. They remain flat as they were produced, or they do not retain their original shape. There has never been known shape memory film capable of remembering a specific basic shape and also taking on a second shape as desired.

OBJECT AND SUMMARY OF THE INVENTION

It is an object of the present invention to provide a shape memory film and a method of using the same, said shape memory film being capable of remembering a basic shape, taking on a second shape according to the object of use, and easily restoring the basic shape when necessary.

The first aspect of the present invention resides in a shape memory film formed from a shape memory transparent polymer, said shape memory film being capable of remembering a basic shape such as plane configuration and dead folds, taking on a second shape when the basic shape is modified (by changing the plane configuration and adding dead folds, twists, three-dimensional configurations, etc.) at a temperature higher than the glass transition point of the polymer and lower than the molding temperature of the polymer, and having the second shape set when cooled to a temperature lower than the glass transition point while being kept in the second shape.

The second aspect of the present invention resides in a method of using a shape memory film which comprises forming a shape memory polymer into a film capable of remembering a basic shape such as plane configuration and dead folds, imparting a second shape to the film (by changing the plane configuration and adding dead folds, twists, three-dimensional configurations, etc.) at a temperature higher than the glass transition point of the polymer and lower than the molding temperature of the polymer, cooling the film to a temperature lower than the glass transition point while keeping the second shape, thereby setting the second shape, and subsequently heating the film to a temperature higher than the glass transition point, thereby causing the film to restore its basic shape.

The present invention provides a shape memory film which remembers a first shape (basic shape), takes on a second shape upon deformation with simple heating operation, and restores its basic shape easily when necessary.

DETAILED DESCRIPTION OF PREFERRED EMBODIMENTS

By the shape memory polymer is generally meant any polymer which remembers its initial shape, has its deformed shape set when it is deformed at a temperature higher than the Tg of the polymer and lower than the molding temperature of the polymer and then cooled to a temperature lower than the Tg while it is kept deformed, and restores its original molded shape when it is heated to a temperature higher than the Tg. This property permits the polymer to be used in two ways according to its as-molded shape and deformed shape which can be selected by a simple heating operation.

The present invention can be practiced by using any polymer which has the above-mentioned property, the ability to be formed into film, and a Tg and adequate modulus which permit the polymer to be easily heated and cooled and deformed according to the intended use and to take on its basic shape and second shape easily.

The shape memory film of the present invention can be produced by ordinary molding method such as extrusion, tubular extrusion blowing, casting, and calendering.

As the shape memory polymer that can be used in the present invention may be cited urethane polymers and styrene-butadiene polymers. Preferable among these polymers is polyurethane prepared by prepolymer process from a difunctional diisocyanate, a difunctional polyol, and a difunctional chain extender containing active hydrogen in a molar ratio of 2.00–1.10:1.00:1.00–0.10, preferably 1.80–1.20:1.00:0.80–0.20. This polyurethane contains NCO groups and OH groups in almost equal amounts at the terminals of the polymer chains. It also has a Tg in the range of $-50°$ to $60°$ C. and a crystallinity of 3 to 50 wt %, and hence it can be formed into film easily.

The polymer contains substantially no excess NCO groups at the terminals of the polymer chains and hence contains no allophanate links which form rigid crosslinks. Therefore, it is a thermoplastic chain polymer which can be processed freely. In addition, having an adequate crystallinity, this chain polymer exhibit a desired modulus.

The crystallinity should preferably be in the range of 3 to 50 wt %. With a crystallinity lower than 3 wt %, the polymer will have a low rubber elasticity at a temperature higher than Tg. Conversely, with a crystallinity higher than 50 wt %, the polymer will have a high rubber elasticity at a temperature higher than Tg, with the result that the ratio of moduli at temperatures $10°$ C. above and below Tg is smaller and hence the shape recovery performance is poor.

The polymer can be produced from the following raw materials, which are illustrative only and not limitative.

The first raw material is a difunctional isocyanate which is represented by the general formula OCN—R—NCO, where R is a group having no or one or two benzene rings. It includes, for example, 2,4-toluene diisocyanate, 4,4'-diphenylmethane diisocyanate, carbodiimide-modified 4,4'-diphenylmethane diisocyanate, and hexamethylene diisocyanate.

The second raw material is a difunctional polyol which is represented by the general formula OH—R'—OH, where R' is a group having no or one or two benzene rings. The second raw material may also be a reaction product of said difunctional polyol and a difunctional carboxylic acid or cyclic ether. It includes, for example, polypropylene glycol, 1,4-butane glycol adipate, polytetramethylene glycol, polyethylene glycol, and an adduct of bisphenol-A with propylene oxide.

The third raw material is a difunctional chain extender containing active hydrogen which is represented by the general formula OH—R"—OH, where R" is a $(CH_2)_n$ group or a groups having one or two benzene rings. It includes, for example, ethylene glycol, 1,4-butane glycol, bis(2-hydroxyethyl)hydroquinone, an adduct of bisphenol-A with ethylene oxide, and an adduct of bisphenol-A with propylene oxide.

The above-mentioned three raw materials (isocyanate, polyol, and chain extender) are made into a urethane elastomer (by the aid of an optional catalyst) by prepolymer process in the following manner.

First, the diisocyanate and polyol are reacted in a specific molar ratio of [NCO]/[OH] to give a prepolymer. When the reaction is complete, the chain extender is added in an amount sufficient to establish a desired molar ratio of [chain extender]/[prepolymer]. After defoaming, the resulting mixture is poured into a mold, followed by curing for crosslinking reaction at 80° C. for one or two days in a constant temperature dryer. This process may be carried out with or without solvent.

The polyurethane elastomer produced as mentioned above will have a Tg and other physical properties as desired, if the following six factors are properly selected. (1) the kind of the isocyanate, (2) the kind of the polyol, (3) the kind of the chain extender, (4) the [NCO]/[OH] molar ratio, (5) the [chain extender]/[prepolymer] molar ratio, and (6) the curing condition.

The thus produced polyurethane elastomer may be represented by the following general formula.

$$HOR"OCONH(RNHCOOR'OCONH)_nRNHCOOR"OCONH(RNHCOOROCONH)_mRNHCOOR"OH$$

where m is 1–16 and n is 0–16.

EXAMPLES 1 to 40

The following illustrates the production of the shape memory polyurethane. First, a prepolymer was prepared by reacting, in the absence of catalyst, an isocyanate component and a polyol component in the ratio shown in Table 1. To the prepolymer was added a chain extender in the ratio shown in Table 1. The resulting mixture was heat-cured to give shape memory polyurethane, which had the basic physical properties as shown in Table 1.

In Table 1, E/E' represents the ratio of the tensile modulus at a temperature 10° C. lower than Tg to the tensile modulus at a temperature 10° C. higher than Tg. The crystallinity (wt %) was measured by X-ray diffractometry. The Tg (°C.) was measured by the DSC method (differential scanning calorimetry). The tensile modulus was measured according to the method provided in JIS K-7113 (Japanese Industrial Standards).

TABLE 1

| Raw materials and molar ratio | M.W. | 1 | 2 | 3 | 4 | 5 | 6 | 7 | 8 | 9 | 10 |
|---|---|---|---|---|---|---|---|---|---|---|---|
| Diisocyanate | | | | | | | | | | | |
| 2,4-toluene diisocyanate | 174 | 1.5 | | | 1.5 | | | | | | |
| 4,4'-diphenylmethane diisocyanate | 250 | | | | | 1.5 | | | 1.5 | 1.5 | 1.5 |
| 4,4'-diphenylmethane diisocyanate (carbodiimide-modified) | 290 | | | | | | 1.5 | | | | |
| 4,4'-diphenylmethane diisocyanate (carbodiimide-modified) | 303 | | 1.5 | 1.5 | | | | | | | |
| hexamethylene diisocyanate | 168 | | | | | | | 1.5 | | | |
| Polyol | | | | | | | | | | | |
| polypropylene glycol | 400 | | | | | | | | | | |
| polypropylene glycol | 700 | | | 1.0 | 1.0 | 1.0 | 1.0 | 1.0 | 1.0 | 1.0 | 1.0 |
| polypropylene glycol | 1000 | | 0.88 | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | | | | | | | | | | |
| polytetramethylene glycol | 650 | | | | | | | | | | |
| polytetramethylene glycol | 850 | | | | | | | | | | |
| polytetramethylene glycol | 1000 | | | | | | | | | | |
| polyethylene glycol | 600 | | | | | | | | | | |
| bisphenol-A + propylene oxide | 800 | 1.0 | | | | | | | | | |
| Chain extender | | | | | | | | | | | |
| ethylene glycol | 62 | | | | | | | | 0.51 | | |
| 1,4-butane glycol | 90 | 0.51 | | | | | | | | 0.51 | |
| bis(2-hydroxyethyl)hydroquinone | 198 | | | | | | | | | | |
| bisphenol-A + ethylene oxide | 327 | | | | | | | | | | |
| bisphenol-A + ethylene oxide | 360 | | 0.51 | 0.51 | 0.51 | 0.51 | 0.51 | 0.51 | | | |
| bisphenol-A + propylene oxide | 360 | | | | | | | | | | 0.51 |
| Measured values of physical properties | | | | | | | | | | | |
| Tg (°C.) | | 24 | −10 | 15 | −11 | 14 | 16 | −45 | 9 | 6 | 12 |
| E/E' | | 170 | 73 | 69 | 23 | 129 | 133 | 20 | 117 | 128 | 97 |
| Crystallinity (wt %) | | | 20 | 20 | 30 | | | 25 | | | |
| Raw materials and molar ratio | M.W. | 11 | 12 | 13 | 14 | 15 | 16 | 17 | 18 | 19 | 20 |
| Diisocyanate | | | | | | | | | | | |
| 2,4-toluene diisocyanate | 174 | | | | | | | | | | |
| 4,4'-diphenylmethane diisocyanate | 250 | 1.5 | 1.5 | 1.5 | 1.2 | 1.8 | 1.35 | 1.35 | 1.35 | 1.35 | 1.35 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |

TABLE 1-continued

| Raw materials and molar ratio | M.W. | | | | | | | | | | |
|---|---|---|---|---|---|---|---|---|---|---|---|
| polypropylene glycol | 400 | | | | | | | | | | |
| polypropylene glycol | 700 | 1.0 | 1.0 | | 1.0 | 1.0 | 1.0 | | | | |
| polypropylene glycol | 1000 | | | | | | | 1.0 | | | |
| 1,4-butaneglycol adipate | 600 | | | | | | | | 1.0 | | |
| 1,4-butaneglycol adipate | 1000 | | | | | | | | | 1.0 | |
| 1,4-butaneglycol adipate | 2000 | | | | | | | | | | 1.0 |
| polytetramethylene glycol | 650 | | | | | | | | | | |
| polytetramethylene glycol | 850 | | | | | | | | | | |
| polytetramethylene glycol | 1000 | | | | | | | | | | |
| polyethylene glycol | 600 | | | 1.0 | | | | | | | |
| bisphenol-A + propylene oxide | 800 | | | | | | | | | | |
| Chain extender | | | | | | | | | | | |
| ethylene glycol | 62 | | | | | | | | | | |
| 1,4-butane glycol | 90 | | | | | | | | | | |
| bis(2-hydroxyethyl)hydroquinone | 198 | | 0.51 | | | | | | | | |
| bisphenol-A + ethylene oxide | 327 | 0.51 | | | 0.21 | 0.81 | 0.36 | 0.36 | 0.36 | 0.36 | 0.36 |
| bisphenol-A + ethylene oxide | 360 | | | | | | | | | | |
| bisphenol-A + propylene oxide | 360 | | | | | | | | | | |
| Measured values of physical properties | | | | | | | | | | | |
| Tg (°C.) | | 16 | −7 | −6 | −4 | 25 | 5 | −22 | 10 | −18 | −45 |
| E/E' | | 111 | 49 | 12 | 105 | 53 | 37 | 81 | 100 | 29 | 30 |
| Crystallinity (wt %) | | | 20 | 30 | | 20 | 25 | | | 25 | 25 |

| Raw materials and molar ratio | M.W. | 21 | 22 | 23 | 24 | 25 | 26 | 27 | 28 | 29 | 30 |
|---|---|---|---|---|---|---|---|---|---|---|---|
| Diisocyanate | | | | | | | | | | | |
| 2,4-toluene diisocyanate | 174 | | | | | | | 1.5 | 1.4 | 1.3 | 1.2 |
| 4,4'-diphenylmethane diisocyanate | 250 | 1.35 | 1.35 | 1.35 | 1.5 | 1.5 | 1.35 | | | | |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | 1.0 | | | | |
| polypropylene glycol | 700 | | | | 1.0 | 1.0 | | | | | |
| polypropylene glycol | 1000 | | | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | | | | | | | | | | |
| polytetramethylene glycol | 650 | 1.0 | | | | | | | | | |
| polytetramethylene glycol | 850 | | 1.0 | | | | | | | | |
| polytetramethylene glycol | 1000 | | | 1.0 | | | | | | | |
| polyethylene glycol | 600 | | | | | | | | | | |
| bisphenol-A + propylene oxide | 800 | | | | | | | 1.0 | 1.0 | 1.0 | 1.0 |
| Chain extender | | | | | | | | | | | |
| ethylene glycol | 62 | | | | | | | | | | |
| 1,4-butane glycol | 90 | | | | | | | | | | |
| bis(2-hydroxyethyl)hydroquinone | 198 | | | | | | | 0.51 | 0.41 | 0.31 | 0.21 |
| bisphenol-A + ethylene oxide | 327 | 0.36 | 0.36 | 0.36 | 0.43 | 0.35 | 0.36 | | | | |
| bisphenol-A + ethylene oxide | 360 | | | | | | | | | | |
| bisphenol-A + propylene oxide | 360 | | | | | | | | | | |
| Measured values of physical properties | | | | | | | | | | | |
| Tg (°C.) | | −18 | −30 | −38 | 5 | 8 | 23 | 26 | 21 | 19 | 19 |
| E/E' | | 33 | 18 | 40 | 33 | 100 | 126 | 140 | 125 | 108 | 101 |
| Crystallinity (wt %) | | 25 | 25 | | 25 | 15 | 15 | 10 | 15 | 15 | 15 |

| Raw materials and molar ratio | M.W. | 31 | 32 | 33 | 34 | 35 | 36 | 37 | 38 | 39 | 40 |
|---|---|---|---|---|---|---|---|---|---|---|---|
| Diisocyanate | | | | | | | | | | | |
| 2,4-toluene diisocyanate | 174 | | | 1.5 | | | | | | | |
| 4,4'-diphenylmethane diisocyanate | 250 | 1.59 | 1.68 | | 1.3 | 1.7 | 1.59 | 1.68 | 1.5 | 1.5 | 1.81 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| polypropylene glycol | 700 | 1.0 | 1.0 | | 1.0 | 1.0 | 1.0 | 1.0 | | | |
| polypropylene glycol | 1000 | | | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | | | | | | | | | | |
| polytetramethylene glycol | 650 | | | | | | | | | | |
| polytetramethylene glycol | 850 | | | | | | | | | | |
| polytetramethylene glycol | 1000 | | | | | | | | | | |
| polyethylene glycol | 600 | | | | | | | | | | |
| bisphenol-A + propylene oxide | 800 | | | 1.0 | | | | | 1.0 | 1.0 | 1.0 |
| Chain extender | | | | | | | | | | | |
| ethylene glycol | 62 | | | | 0.31 | 0.71 | 0.51 | 0.51 | | | |
| 1,4-butane glycol | 90 | | | | | | | | 0.51 | | |

TABLE 1-continued

| | | | | | | | | | | | |
|---|---|---|---|---|---|---|---|---|---|---|---|
| bis(2-hydroxyethyl)hydroquinone | 198 | | | 0.51 | | | | | | 0.51 | 0.81 |
| bisphenol-A + ethylene oxide | 327 | | | | | | | | | | |
| bisphenol-A + ethylene oxide | 360 | 0.51 | 0.51 | | | | | | | | |
| bisphenol-A + propylene oxide | 360 | | | | | | | | | | |
| Measured values of physical properties | | | | | | | | | | | |
| Tg (°C.) | | 10 | 11 | 22 | 2 | 15 | 11 | 12 | 35 | 40 | 48 |
| E/E' | | 126 | 126 | 107 | 83 | 122 | 100 | 135 | 124 | 138 | 152 |
| Crystallinity (wt %) | | 15 | 20 | 15 | 20 | 15 | 15 | 10 | 10 | 5 | 5 |

EMBODIMENT 1

An experiment was carried out in wrapping an ice cream with the shape memory film of the present invention and storing the wrapped ice cream in a refrigerator. A polymer having a Tg of 11° C. was prepared by prepolymer process according to the formulation of Example No. 36 shown in Table 1. The polymer was made into a film measuring 10 cm wide (in flat form) and 100 μm thick by extrusion. The film was wound up at about 20° C.

Prior to use, the rolled film was heated to about 20° C., unwound, and cut to a length of 10 cm.

An ice cream was wrapped with this film, with the four corners collected and twisted together, and the wrapped ice cream was stored in a refrigerator at 0° C.

Subsequently, the wrapped ice cream was taken out from the refrigerator and the film was given a blow of warm air (at about 30° C.). The film restored its original shape and became flat in about 10 seconds.

As demonstrated in this embodiment, the shape memory film of the present invention makes it possible to serve an ice cream placed at the center of the film simply by giving it a blow of warm air, without having to touching directly the ice cream or opening the film.

EMBODIMENT 2

An easy-to-fill bag was prepared from the shape memory film of the present invention. A polymer having a Tg of 8° C. was prepared by prepolymer process according to the formulation of Example No. 25 shown in Table 1. The polymer was made into a tubular film 200 μm thick by tubular film extrusion. The tubular film was shaped into a quadrangular prism having a cross-section measuring 6 cm by 20 cm.

With the shaped tubular film heated to about 25° C., the narrow side (6 cm wide) was folded inward at its center so that the tubular film was flattened. The flattened shape was set by cooling to 10° C. The tubular film was cut to a length of 35 cm and each cut piece was made into a bag by heat-sealing one end thereof.

Upon heating to 25° C. after storage, the folded bag restored its original shape (square cross-section) in a short time, facilitating the filling of the bag. After filling, the filled bag was placed in a refrigerator at 0° C., with the mouth closed. The mouth set in the closed state and the filled bag remained closed.

Upon transfer from the refrigerator to a room at 25° C., the filled bag restored its original shape (rectangular cross-section), with the mouth open, permitting the content to be taken out easily.

EMBODIMENT 3

Narrow tape for taping was prepared by slitting the shape memory film of the present invention as follows: First, a polymer having a Tg of 40° C. was prepared by prepolymer process according to the formulation of Example No. 39 shown in Table 1. Then, the polymer was made into a 500 μm thick film by extrusion, and the film was slit into tape 1 cm wide. The flat shape of the tape was set for memory. The tape was wound into a roll at about 50° C. The wound tape was stored at room temperature.

Prior to use, the roll of the tape was heated to about 50° C. using an air blow dryer. The tape was unwound and immediately wound round a taping object and the ends of the tape were twisted together two or three times before it was cooled below 40° C. (which is the Tg). The wound and twisted tape was cooled to room temperature to set the wound and twisted shape of the tape.

Upon heating to about 50° C. with an air blow dryer, the wound and twisted tape became untwisted and restored its original flat shape, permitting one to take out the object without having to touch the tape directly.

As the above-mentioned embodiments show, the present invention provides a shape memory film which remembers a first shape (basic shape), takes on a second shape upon deformation with simple heating operation, and restores its basic shape easily when necessary owing to its shape memory performance.

What is claimed is:

1. A shape memory polyurethane polymer consisting of a difunctional diisocyanate, difunctional polyol and difunctional chain-extender containing active hydrogen in the form of a film, said film having been formed into a first shape at a temperature higher than the glass transition point, and then having been formed into a second shape at a temperature above the glass transition point and maintained in said second shape and cooled to a temperature below the glass transition point whereby the film maintains said second shape, said film being capable of resuming said first shape upon heating at a temperature higher than the glass transition point wherein said polyurethane contains almost equal amounts of NCO groups and OH groups at the terminals of the polymer chains and has a glass transition point in the range of −50° to 60° C. and a crystallinity of 3 to 50 wt. %.

2. A shape memory polymer as claimed in claim 1 wherein said difunctional is cyanate, difunctional polyol and difunctional chain-extender are polymerized in molecular ratios 2.00~1.10:1.00:1.00~0.10.

3. A packaging bag made from the polymer of claim 1.

4. The polymer of claim 1 wherein the first shape has one or more folds in it and the second shape has additional folds, twists, concavities or convexities.

* * * * *